(12) United States Patent
Hsu et al.

(10) Patent No.: US 7,777,425 B2
(45) Date of Patent: Aug. 17, 2010

(54) BACKLIGHT CIRCUIT FOR LCD PANEL

(75) Inventors: Houng-Kuo Hsu, Taoyuan (TW);
Chu-Chang Chen, Keelung (TW);
Ching-Chuan Kuo, Taipei (TW)

(73) Assignee: O2Micro International Limited, Grand Cayman (KY)

( * ) Notice: Subject to any disclaimer, the term of this patent is extended or adjusted under 35 U.S.C. 154(b) by 692 days.

(21) Appl. No.: 11/809,046

(22) Filed: May 30, 2007

(65) Prior Publication Data
US 2008/0067951 A1 Mar. 20, 2008

Related U.S. Application Data

(60) Provisional application No. 60/845,864, filed on Sep. 19, 2006.

(51) Int. Cl.
*H05B 41/16* (2006.01)
(52) U.S. Cl. .................. 315/282; 315/291; 315/224; 315/312; 315/325; 345/102; 345/204; 363/21.17; 363/109

(58) Field of Classification Search ............. 315/209 R, 315/247, 224, 276–278, 282, 291, 312, 324, 315/325; 345/87, 95, 102, 204; 363/21.12, 363/21.17, 98, 109, 132
See application file for complete search history.

(56) References Cited

U.S. PATENT DOCUMENTS 6,781,325 B2 * 8/2004 Lee ............................ 315/282
7,205,726 B2 * 4/2007 Maeda et al. ................ 315/277
7,477,023 B2 * 1/2009 Shimura et al. ............. 315/282

* cited by examiner

*Primary Examiner*—Haissa Philogene

(57) ABSTRACT

A multi-lamp backlight system is disclosed. The multi-lamp backlight system includes a plurality of lamps, an inverter circuit and a current balance circuit. The inverter circuit is capable of converting a DC input signal to a pair of AC output signals, which have a 180 degree phase shift. The pair of AC output signals are delivered to the plurality of lamps. The current balance circuit is connected to the low voltage sides of the plurality of lamps for balancing the lamp currents.

23 Claims, 8 Drawing Sheets

BACKLIGHT CIRCUIT FOR LCD PANEL

RELATED APPLICATION

This application claims priority to U.S. Provisional Application No. 60/845,864, filed on Sep. 19, 2006, which is hereby incorporated in its entirety by reference.

BACKGROUND

1. Field of the Invention

The present invention relates to backlight circuits, and more particularly to backlight circuits for large size liquid crystal displays (LCDs).

2. Description of the Related Art

LCD panels are used in various applications ranging from portable electronic devices to fixed location units, such as laptop PCs, video cameras, automobile navigation systems, and industrial machines. The LCD panel itself cannot emit light but must be backlit by a light source. The most commonly used backlight source is a cold-cathode fluorescent lamp (CCFL). Usually, igniting and running the CCFL requires a high alternating current (AC) signal. To generate such a high AC signal from a direct current (DC) power source, e.g., a rechargeable battery, a DC/AC inverter is designed to drive the CCFL.

However, in recent years, there has been increasing interest in large size LCD displays, used for example in LCD TV sets and computer monitors, which require multiple CCFLs to provide high intensity illumination. Nowadays, multiple long CCFLs are widely used in large LCD panels. Normally, terminals of the long CCFL are driven by two separate inverters, each of which provides an alternating voltage with a 180-degree phase shift relative to the other. This is a so-called floating lamp structure as illustrated in FIG. 1. An exemplary circuit 100 in FIG. 1 includes inverters 110 and 120 that are coupled respectively to the terminals of a long CCFL 130 and designed to provide alternating voltages +V and −V. The floating lamp structure in FIG. 1 may reduce the leakage current between the long CCFL 130 and a chassis 140, which in turn maintains even brightness over the entire CCFL 130. However, the circuit 100 becomes complicated as the number of CCFLs increases. Additionally, with multiple CCFLs, it is hard to ensure current balance among all CCFLs and the imbalance of the CCFL currents will give rise to a reduced lifetime of the CCFLs and non-uniformity of brightness.

FIG. 2 illustrates a schematic diagram of a conventional multi-CCFL backlight system 200. The multi-CCFL backlight system 200 includes a current balance circuit 210 comprising current balance transformers TC6 to TC10 (TC1 to TC5) that are coupled to the high-voltage terminal of the power transformer T1 (T2). However, the high-voltage terminal of the power transformer T1 (T2) experiences an AC voltage of more than a thousand volts for such applications, and therefore devices coupled to the high-voltage terminal require extra attention to prevent any safety hazards and concerns. Additionally, there are twice as many current balance transformers (TC1 to TC10) as lamps (CCFL1 to CCFL5) in the system, adding to the complexity and overall cost to the backlight system.

Some other configurations of multi-CCFL backlight systems are taught by U.S. Pat. No. 6,781,325 B2 in FIG. 3 and illustrated by conventional circuits in FIGS. 4 and 5. In FIG. 3, an exemplary circuit 300 includes a balance circuit 310 comprising current balance transformers TC10 to TC18 (TC1 to TC9). The balance circuit 310 is designed to balance lamp currents of N CCFLs by using 2N−2 current balance transformers. In FIG. 4, an exemplary circuit 400 includes a balance circuit 410 comprising current balance transformers TC11 to TC20 (TC1 to TC10). The balance circuit 410 is designed to balance lamp currents of N CCFLs by using 2N current balance transformers. In FIG. 5, an exemplary circuit 500 includes a balance circuit 510 comprising current balance transformers TC11 to TC20 (TC1 to TC10). Also, the balance circuit 510 is designed to balance lamp currents of N CCFLs by using 2N current balance transformers. All these configurations of multi-CCFL backlight systems suffer from large element count, complex circuitry and safety limitations as mentioned above.

Furthermore, the lamp array usually deployed in the multi-lamp backlight systems employs long CCFLs, which are expensive and difficult to replace if broken. Additionally, the long CCFLs tend to deposit mercury on the bottom wall and the deposited mercury will eventually degrade the uniformity of illumination. Moreover, the long CCFLs are difficult to manufacture and need large storage space.

SUMMARY

Embodiments in accordance with the present invention provide multi-lamp backlight circuits that are cost-effective and free of safety concerns caused by high voltage terminals of the backlight lamps. To this end, the multi-lamp backlight circuit replaces conventional long backlight lamps with shorter backlight lamps. Two series-coupled shorter backlight lamps can provide the illumination of one conventional long backlight lamp. The multi-lamp backlight circuit may further include an inverter board coupled to high voltage sides of the shorter backlight lamps and a current balance board coupled to the low voltage sides of the shorter backlight lamps. Furthermore, the current balance board contains reduced balance transformers compared to traditional current balance boards.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION

Reference will now be made in detail to embodiments of the present invention. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
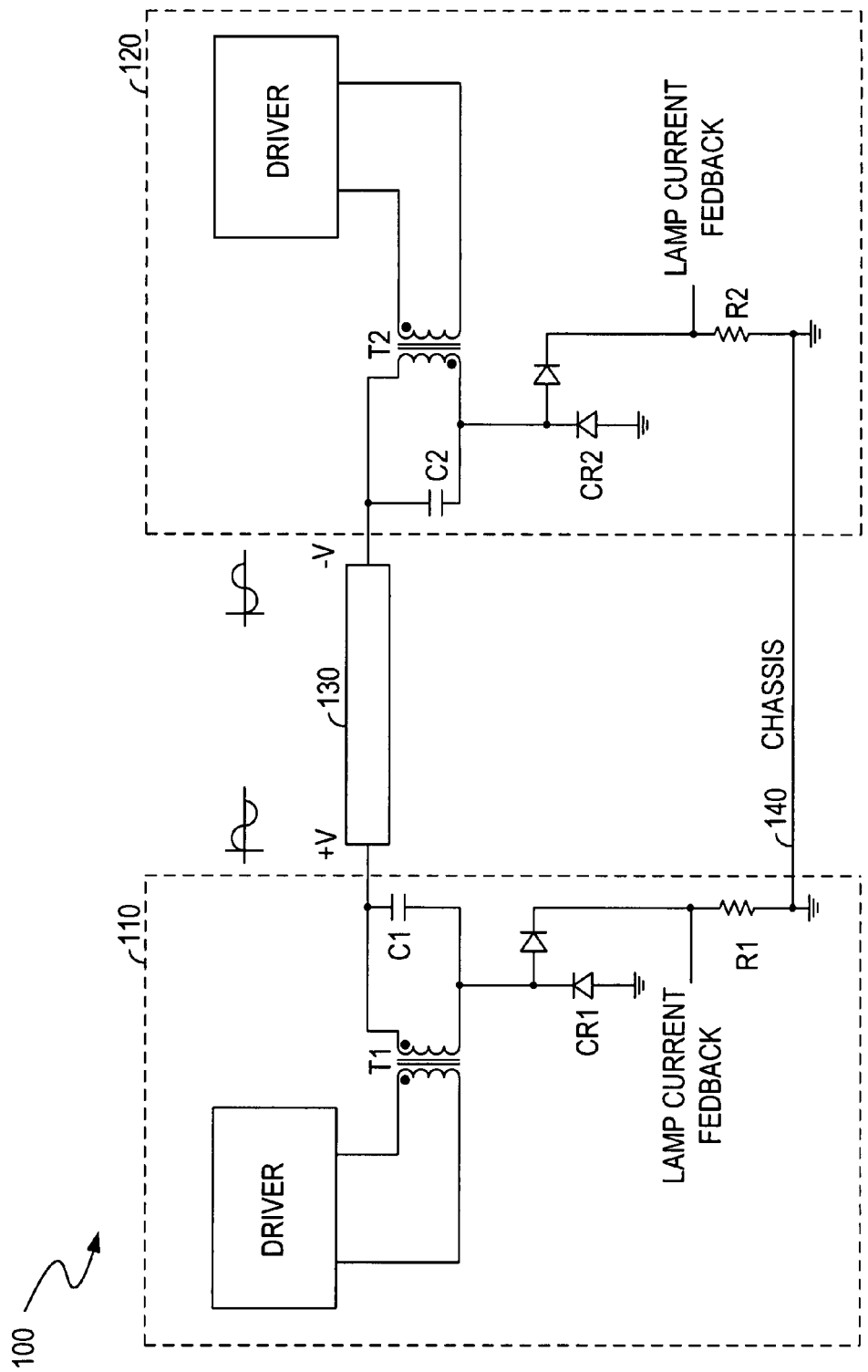
FIG. 1 is a schematic diagram of a conventional backlight system.
Figure 2:
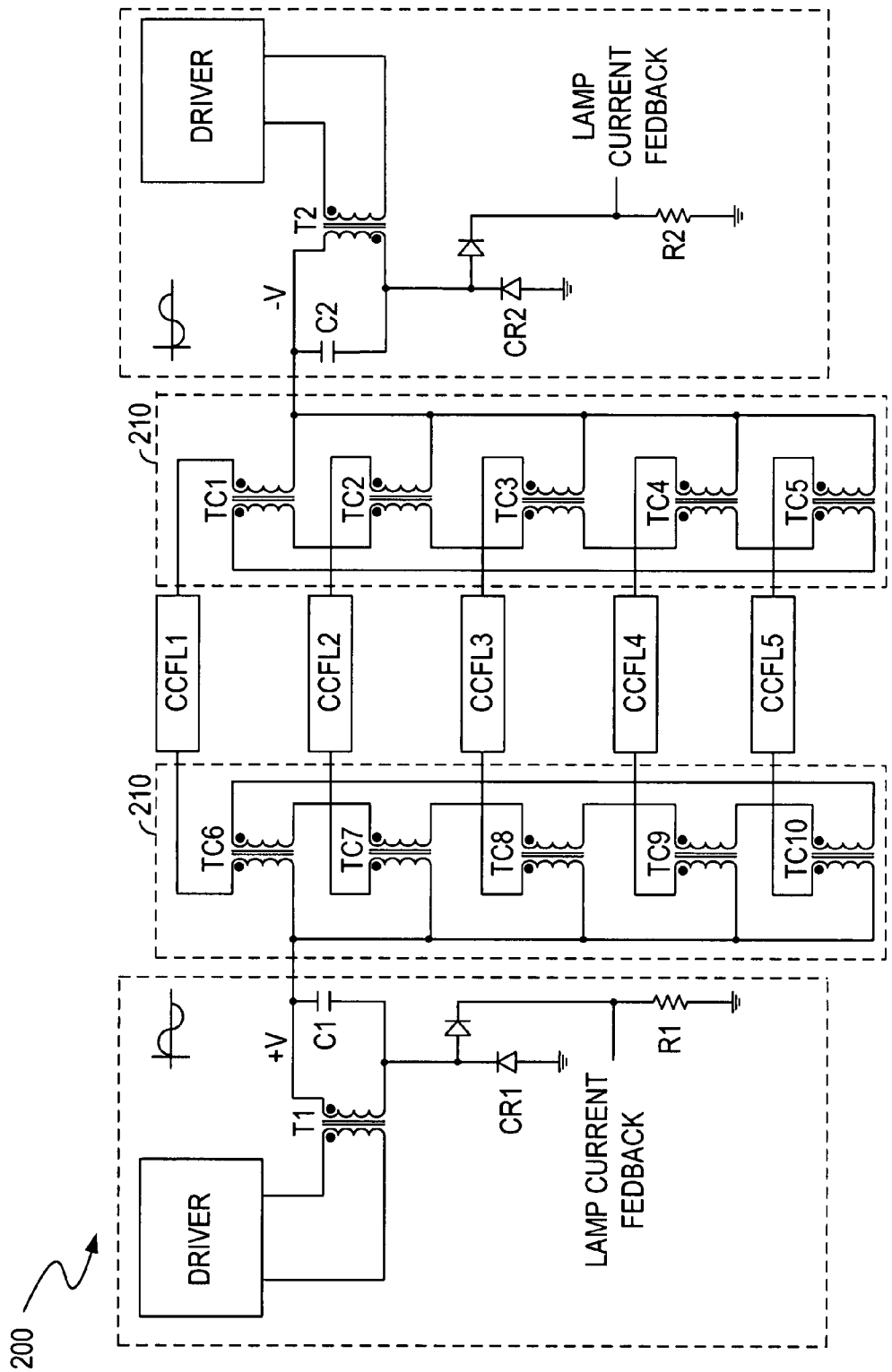
FIG. 2 is a schematic diagram of a conventional multi-lamp backlight system.
Figure 3:
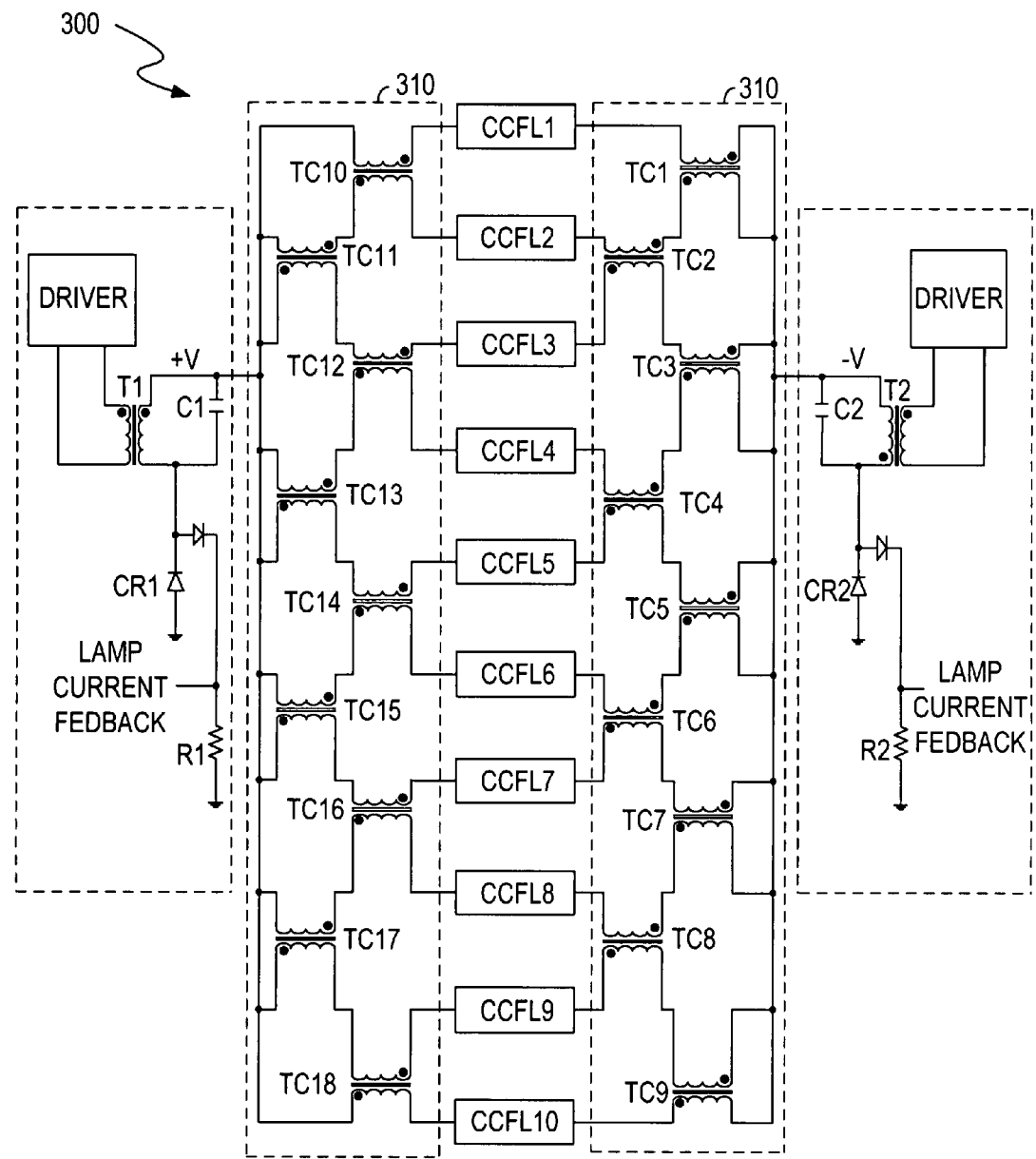
FIG. 3 is a schematic diagram of another conventional multi-lamp backlight system.
Figure 4:
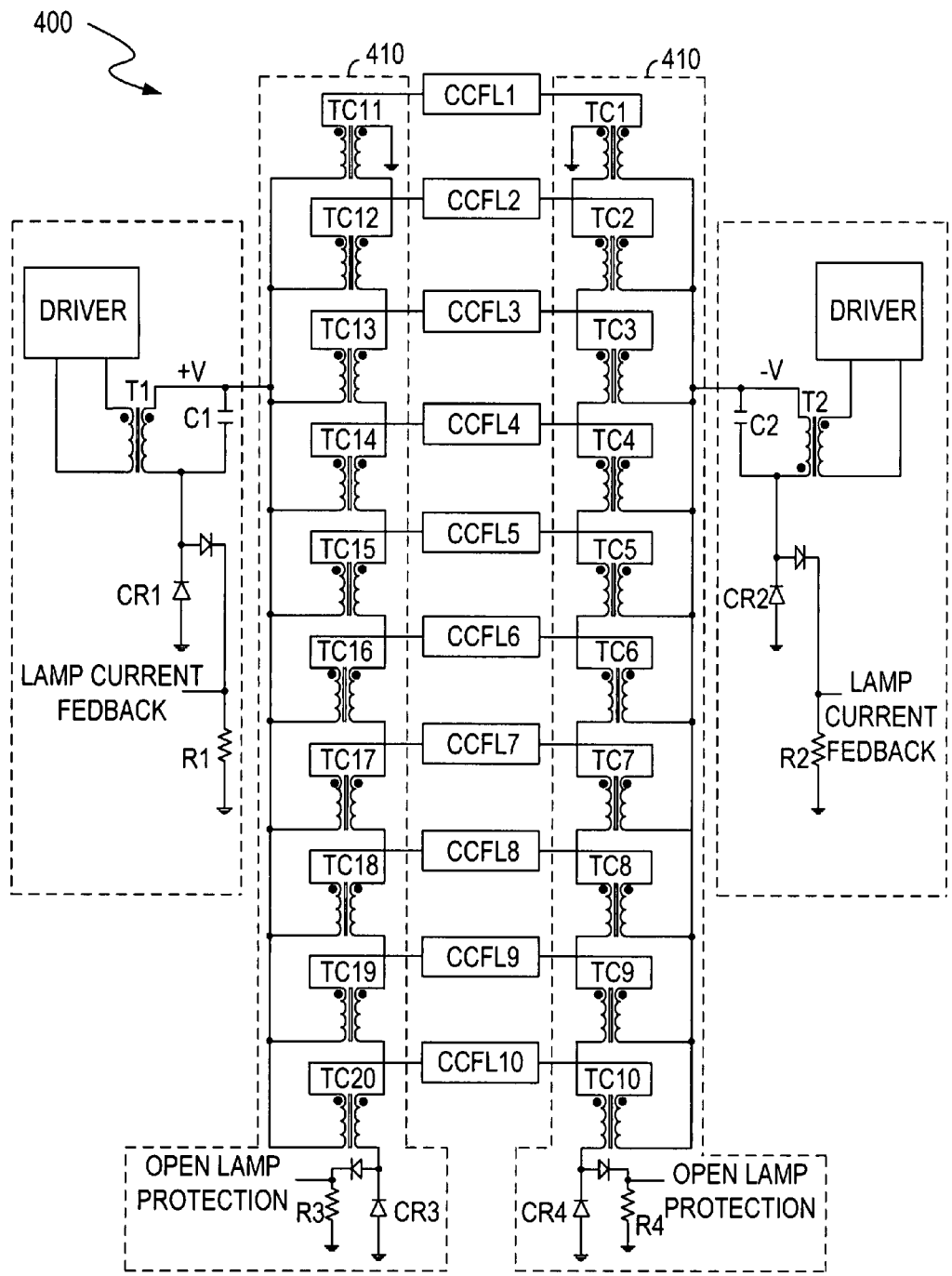
FIG. 4 is a schematic diagram of another conventional multi-lamp backlight system.
Figure 5:
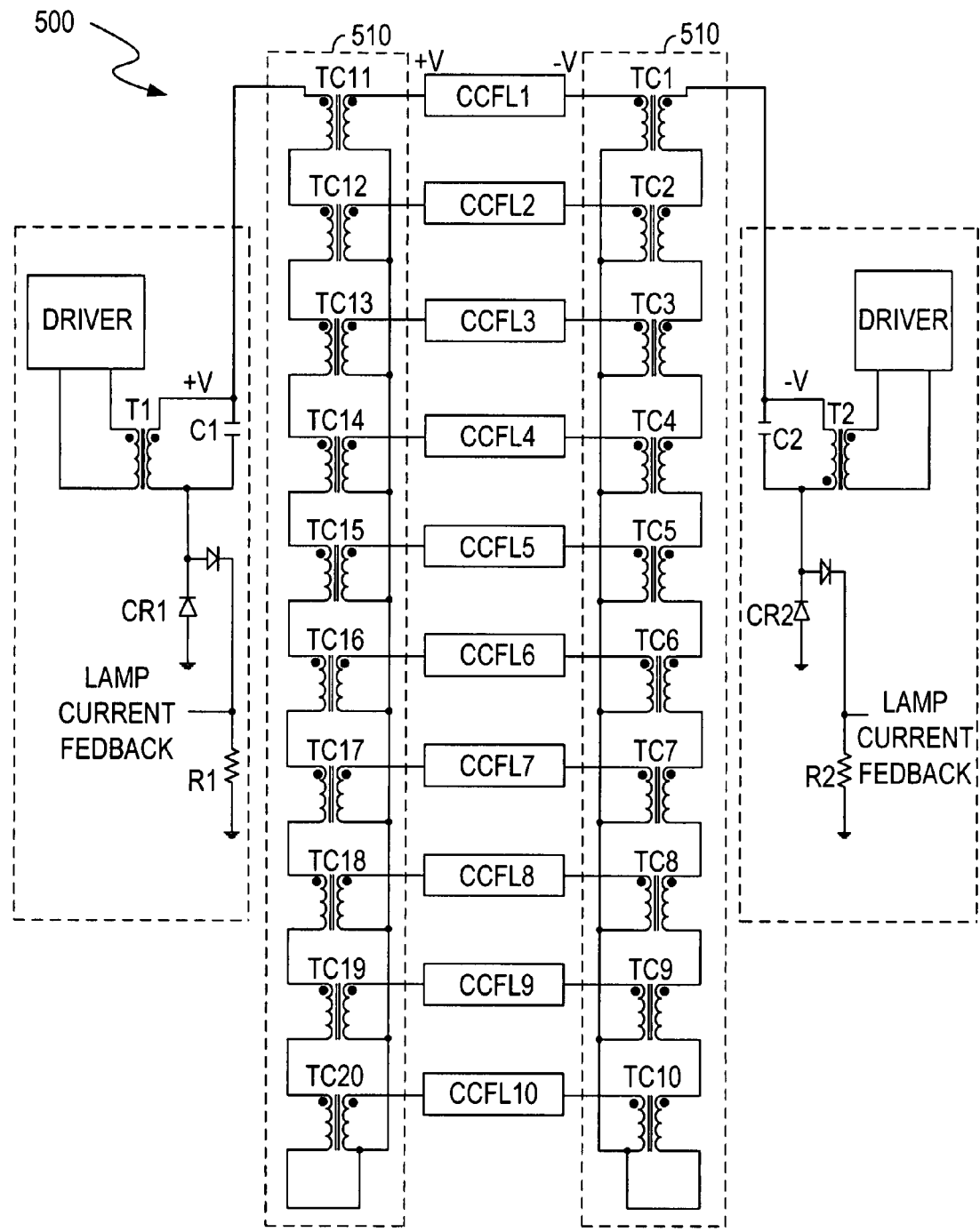
FIG. 5 is a schematic diagram of another conventional multi-lamp backlight system.
Figure 6:
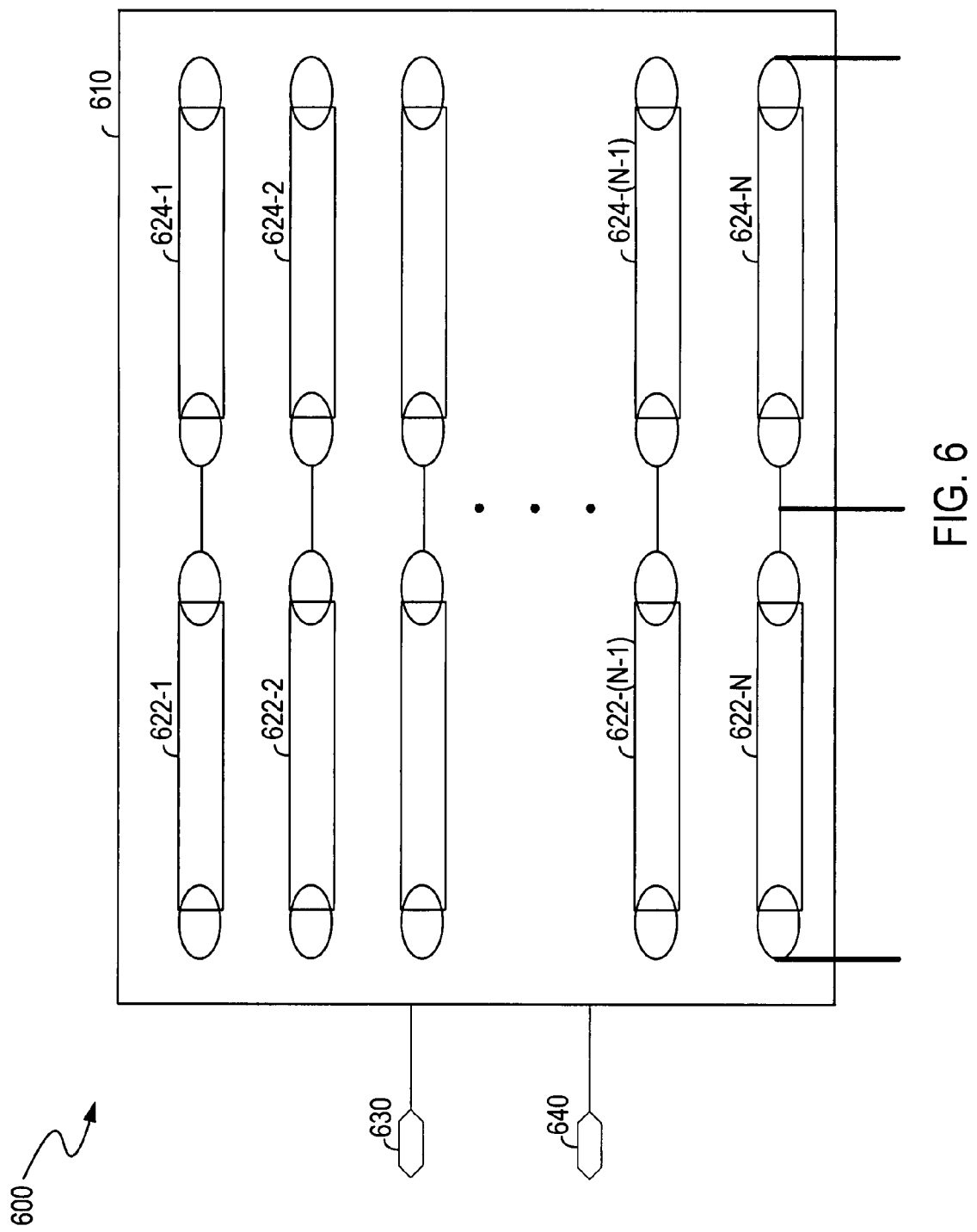
FIG. 6 is a perspective diagram of a lamp array according to one embodiment of the present invention.

FIG. 6 illustrates a perspective view of an exemplary lamp array 600. The lamp array 600 is placed in the rear of a LCD panel 610 for supplying illumination. The LCD panel further receives a power supply from a power input 630 and image signals from a video input 640 for displaying images. The lamp array 600 is made by means of fluorescent tubes, for examples, CCFLs 622-1, 624-1, 622-2 . . . to 624-N. To obtain satisfactorily uniform and high luminance on the entire rear of the LCD panel 610, an assembly of multiple tubes, generally placed in parallel, is used. Instead of adopting long tubes that are placed in parallel in conventional large size LCD applications, the lamps array 600 replaces the conventional long tube with two shorter series tubes, and therefore the cost of large size LCD panels is significantly reduced.

As shown in FIG. 6, the CCFL 622-1 is coupled in series with the CCFL 624-1 to form a first tube pair. The CCFL 622-2 is coupled in series with the CCFL 624-2 to form a second tube pair. Similarly, the CCFL 622-N is coupled in series with the CCFL 624-N to form an $N^{th}$ tube pair. All tube pairs included in the example of FIG. 6 are placed in parallel to illuminate the LCD panel 610. In each tube pair, if one shorter CCFL has a length of L1 and the other shorter CCFL has a length of L2, the two shorter CCFLs will be able to jointly provide illumination equivalent to a traditional long CCFL of the length L1+L2. Fox example, two 26-inch CCFLs may yield the illumination of the traditional long CCFL in a 56-inch LCD panel. Moreover, by using the shorter CCFLs, a cost saving of more than 40% can be achieved.

Figure 7:
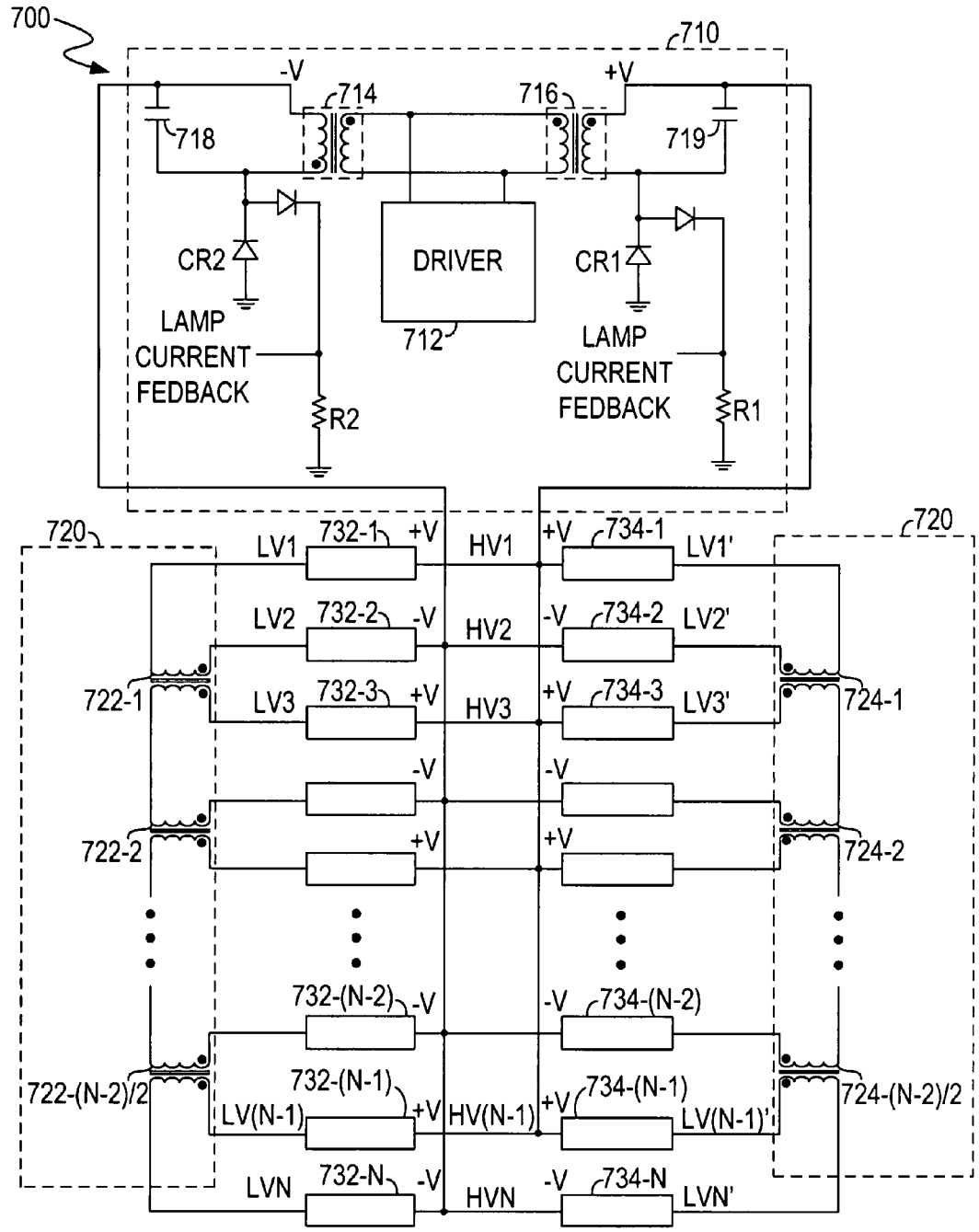
FIG. 7 is schematic diagram of a multi-lamp backlight system according to one embodiment of the present invention.

FIG. 7 illustrates an exemplary circuit 700 for driving multiple loads such as fluorescent tubes (e.g., CCFLs). The circuit 700 includes an inverter board 710 and a current balance board 720. The inverter board 710 is designed to provide alternating voltages +V and −V, which have a 180-degree phase shift relative to each other. The alternating voltages +V and −V are further coupled to the high voltage sides HV1 to HVN of a first plurality of loads, e.g., CCFLs 732-1 . . . to 732-N, and a second plurality of loads, e.g., CCFLs 734-1 . . . to 734-N (which are analogous to the CCFLs of FIG. 6). Driven by the 180-degree phased alternating voltages +V and −V, the CCFLs are ignited to provide the illumination. The current balance board 720 is designed to achieve current balance among the CCFLs. Unlike the conventional circuits where the current balance board is coupled to the high voltage sides of the CCFLs, the current balance board 720 is herein coupled to the low voltages sides (LV1 . . . to LVN, LV1' . . . to LVN') of the CCFLs. Consequently, the current balance board 720 will have a reduced overall cost. Also, avoiding high-voltage safety concerns, a reliable method to balance lamp current is realized.

The inverter board 710 further includes a driver 712, transformers 714 and 716, resonant capacitors 718 and 719, and lamp current sensing components CR1, CR2, R1 and R2. The driver 712 is capable of converting a DC voltage to an intermediate AC voltage. The intermediate AC voltage is then fed to the transformers 714 and 716 that promote the intermediate AC voltage to a higher level to respectively produce the AC voltages +V and −V. Because the transformers 714 and 716 have opposite polarities, there will be always a 180-degree phase shift between the AC voltages +V and −V. The voltages +V and −V are alternatively coupled to the high voltage sides of adjacent CCFL pairs. Fox example, if the voltage +V is coupled to the high voltage side HV1 of the series CCFLs 732-1 and 734-1, then the voltage −V will be coupled to the high voltage side HV2 of the series CCFLs 732-2 and 734-2. Sequentially, the voltage +V is coupled to the high voltage side HV(N−1) of the series CCFLs 732-(N−1) and 734-(N−1), and the voltage −V is coupled to the high voltage side HVN of the series CCFLs 732-N and 734-N.

Additionally, the resonant capacitor 718 (719) is coupled in parallel with the secondary winding of the transformer 714 (716). The lamp current sensing components are coupled to the secondary sides of the transformers 714 and 716 for producing a current feedback signal indicative of the power delivered to the CCFLs. Adapted to the current feedback signal, the driver 712 may adjust the power until a predetermined power value is attained.

Instead of using two separate inverter boards as used in conventional circuits, the circuit 700 utilizes a single inverter board 710 to provide the phased AC voltages +V and −V, and thus the overall cost is significantly reduced. Additionally, the inverter board 710 may adopt various inverter topologies, such as the full bridge, the half bridge, the push-pull and the Royer.

The current balance board 720 further includes (N−2) current balance transformers 722-1 . . . to 722-(N−2)/2 and 724-1 . . . to 724-(N−2)/2. Via the current balance transformers, the low voltage sides of the adjacent CCFLs are either electrically coupled by sets of primary and secondary windings or electrically linked by a magnetic filed. For example, the CCFL 732-1 is coupled in series with the CCFL 732-2 through the primary winding of the current balance transformer 722-1. The CCFL 732-3 is coupled in series with the CCFL 732-4 through the secondary winding of the current balance transformer 722-1 and the primary winding of the current balance transformer 722-2. Sequentially, the CCFL 732-(N−1) is coupled in series with the CCFL 732-N through the secondary winding of the current balance transformer 722-(N−2)/2. The current flowing though series CCFLs is therefore identical. Furthermore, the CCFL 732-2 is electrically linked to the CCFL 732-3 through the magnetic field in the transformer 722-1. Sequentially, the CCFL 732-(N−2) is electrically linked to the CCFL 732-(N−1) through the magnetic field in the transformer 722-(N−2)/2. When the turn ratio of the transformers 722-1 to 722-(N−2)/2 is set to be 1:1, there will be identical current flowing through electrically linked CCFLs. Consequently, current balance among the CCFLs 732-1 to 732-N is achieved. Similarly, current balance among the CCFLs 734-1 to 734-N may be achieved.

Compared with the conventional configurations in FIGS. 2 to 5, the number of the current balance transformers in the circuit 700 is reduced tremendously. For example, for a twenty lamp application, there will be forty current balance transformers in addition to two power transformers in the circuit structure shown in FIG. 2. For a twenty lamp application, there will be thirty-eight current balance transformers in addition to two power transformers in FIG. 3, and 40 current balance transformers in addition to two power transformers in FIGS. 4 and 5. In the circuit in FIG. 7, for a twenty lamp application, only eight current balance transformers with two power transformers are used. Furthermore, the current balance transformers in FIG. 7 are located at the low voltage sides of the lamps, and consequently any high-voltage safety concerns are avoided, thereby providing a reliable method of balancing the lamp current. In addition, a fault detection and protection circuit can be easily implemented with the circuit in FIG. 7. On the whole, embodiments according to the present invention reduce the system cost and provide a reliable and efficient solution for the backlight system in, for example, large size LCD applications.

Figure 8:
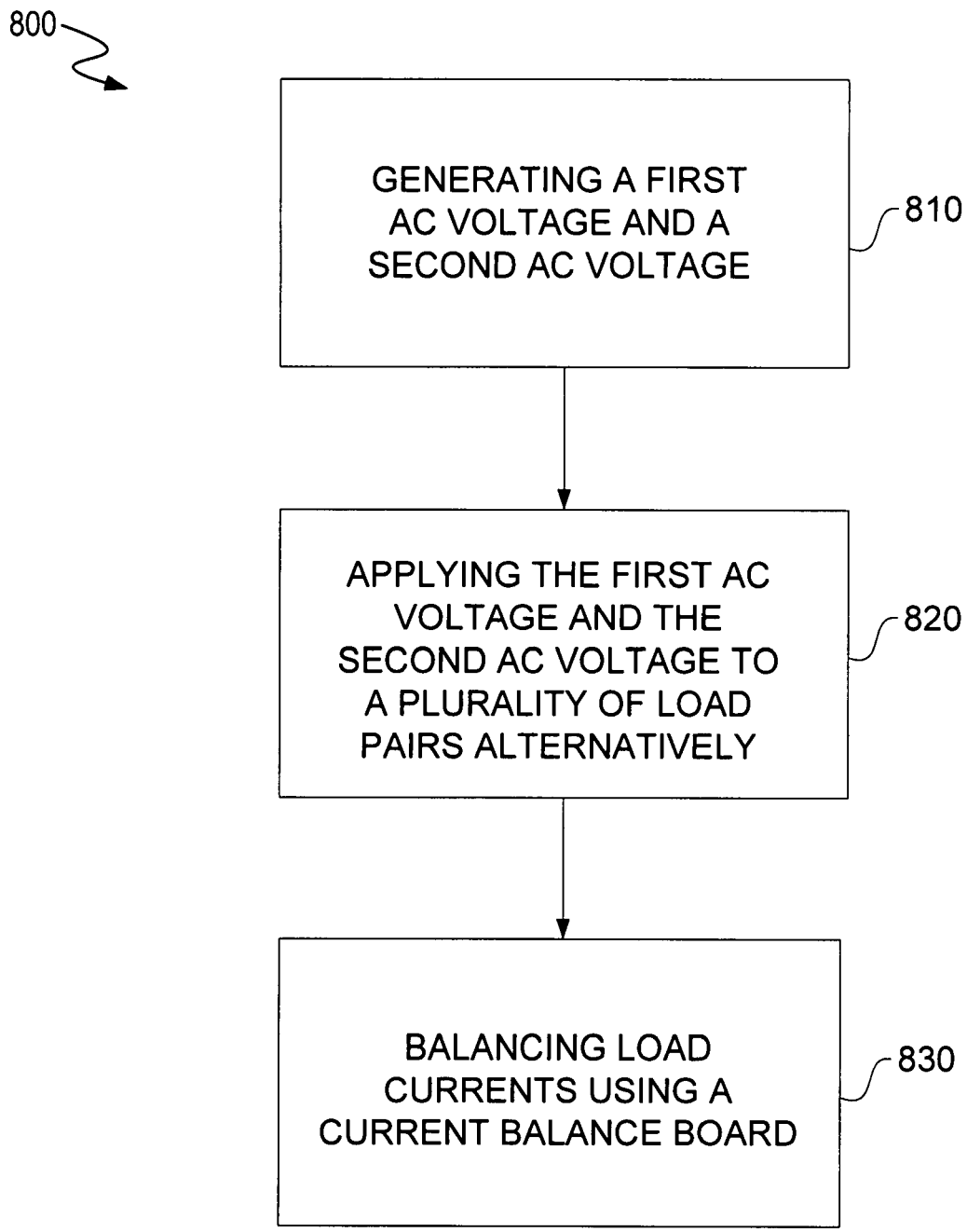
FIG. 8 is a flowchart of a method for driving loads according to one embodiment of the present invention.

FIG. 8 is a flowchart 800 of a method for driving loads according to one embodiment of the present invention. Although specific steps are disclosed in FIG. 8, such steps are exemplary. That is, the present invention is well suited to performing various other steps or variations of the steps recited in FIG. 8.

In block 810, a first AC voltage and a second AC voltage are generated. In one embodiment, a DC voltage is converted to an intermediate AC voltage, which is transformed to the first AC voltage via a first transformer and to the second AC voltage via a second transformer, where the second transformer has an opposite polarity relative to the first transformer.

In block 820, the first AC voltage and the second AC voltage are alternatively applied to a plurality of load pairs placed in parallel. The load pairs each have a high voltage side and a low voltage side. The first and second AC voltages are applied alternatively to the high voltage side.

In block 830, load currents are balanced using a current balance board coupled to the low voltage side.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A circuit comprising:
   an inverter board for converting a direct current (DC) voltage to a first alternating current (AC) voltage and a second AC voltage;
   a first plurality of loads with a first plurality of high voltage sides coupled to said inverter board for receiving said first AC voltage, said first plurality of loads further having a first plurality of low voltage sides;
   a second plurality of loads with a second plurality of high voltage sides coupled to said inverter board for receiving said second AC voltage, said second plurality of loads further having a second plurality of low voltage sides; and
   a current balance board coupled to said first and second pluralities of low voltage sides for balancing load currents.

2. The circuit of claim 1, wherein said inverter board further comprises:
   a driver for converting said DC voltage to an intermediate AC voltage;
   a first transformer coupled to said driver for transforming said intermediate AC voltage to said first AC voltage; and
   a second transformer coupled to said driver for transforming said intermediate AC voltage to said second AC voltage.

3. The circuit of claim 2, wherein said driver is selected from the group consisting of: a full-bridge driver; a half-bridge driver; and a push-pull driver.

4. The circuit of claim 2, wherein said first transformer and said second transformer have opposite polarities.

5. The circuit of claim 1, wherein said first AC voltage has a 180-degree phase shift relative to said second AC voltage.

6. The circuit of claim 1, wherein said first and second pluralities of loads are arranged into a plurality of load pairs coupled in parallel, said load pairs each comprising a first load and a second load coupled in series.

7. The circuit of claim 6, wherein said first load has a first length L1, said second load has a second length L2, and said first load and said second load are able to jointly provide illumination equivalent to a load of length L1+L2.

8. The circuit of claim 1, wherein said first and second pluralities of loads comprise cold cathode fluorescent lamps (CCFLs).

9. The circuit of claim 1, wherein said current balance board further comprises a plurality of balance transformers, said balance transformers each having a turn ratio of 1 to 1.

10. The circuit of claim 9, wherein the number of loads in said first and second pluralities of loads is not more than twice the number of said balance transformers.

11. A method for driving a plurality of loads, comprising;
    generating a first AC voltage and a second AC voltage;
    applying said first AC voltage and said second AC voltage alternatively to said plurality of loads, said plurality of loads each having a high voltage side and a low voltage side, said first and second AC voltages applied alternatively to said high voltage side; and
    balancing load currents using a current balance board coupled to said low voltage side.

12. The method of claim 11, wherein said first AC voltage has a 180-degree phase shift relative to said second AC voltage.

13. The method of claim 11, further comprising:
    converting a DC voltage to an intermediate AC voltage;
    transforming said intermediate AC voltage to said first AC voltage via a first transformer; and
    transforming said intermediate AC voltage to said second AC voltage via a second transformer, wherein said second transformer has an opposite polarity relative to said first transformer.

14. The method of claim 11, wherein said plurality of loads are arranged into a plurality of load pairs, said load pairs each comprising a first load with a length L1 and a second load with a length L2 coupled in series, and wherein said first load and said second load are able to jointly provide illumination equivalent to a load of length L1+L2.

15. The method of claim 11, wherein said current balance board further comprises a plurality of current balance transformers, said current balance transformers each having a turn ratio of 1 to 1.

16. The method of claim 15, wherein the number of loads in said plurality of loads is not more than twice the number of said current balance transformers.

17. The method of claim 11, wherein said plurality of loads comprise cold cathode fluorescent lamps (CCFLs).

18. A display system comprising:
    a power input for receiving a power supply;
    a video input for receiving image signals;
    a liquid crystal display (LCD) panel coupled to said power input and said video signal input for displaying images; and
    a lamp array for backlighting said LCD panel, wherein said lamp array is arranged into a plurality of lamp pairs placed in parallel, said lamp pairs each having a high voltage side and a low voltage side, wherein the high voltage sides of adjacent lamp pairs are alternately coupled to a positive AC voltage and a negative AC voltage, and wherein the low voltage sides of said adjacent lamp pairs are coupled to a current balance board which is used to balance lamp currents.

19. The display system of claim 18, wherein said positive AC voltage and said negative AC voltage are provided by a single inverter board, said inverter board further comprising:

a driver for converting a DC voltage to an intermediate AC voltage;

a first transformer coupled to said driver for transforming said intermediate AC voltage to said positive AC voltage; and a second transformer coupled to said driver for transforming said intermediate AC voltage to said negative AC voltage.

20. The display system of claim 18, wherein said lamp pairs each comprises a first lamp with a lamp length L1 and a second lamp with a lamp length L2 coupled in series, wherein said first lamp and said second lamp are able to jointly provide illumination equivalent to a lamp of length L1+L2.

21. The display system of claim 18, wherein said current balance board comprises a plurality of current balance transformers, wherein said current balance transformers each has a turn ratio of 1 to 1.

22. The display system of claim 21, wherein the number of lamps in said lamp array is not more than twice the number of said balance transformers.

23. The display system of claim 18, wherein said lamp array comprises cold cathode fluorescent lamps (CCFLs).

* * * * *